United States Patent
Tatsumi

(10) Patent No.: US 8,125,187 B2
(45) Date of Patent: Feb. 28, 2012

(54) METHOD OF CONTROLLING BATTERY CHARGING AND DISCHARGING IN A HYBRID CAR POWER SOURCE

(75) Inventor: Hiroshi Tatsumi, Kakogawa (JP)

(73) Assignee: Sanyo Electric Co., Ltd., Osaka (JP)

( * ) Notice: Subject to any disclaimer, the term of this patent is extended or adjusted under 35 U.S.C. 154(b) by 457 days.

(21) Appl. No.: 12/458,946

(22) Filed: Jul. 28, 2009

(65) Prior Publication Data

US 2010/0026243 A1 Feb. 4, 2010

(30) Foreign Application Priority Data

Jul. 29, 2008 (JP) ................................. 2008-195384

(51) Int. Cl.
*H02J 7/00* (2006.01)
*G01N 27/416* (2006.01)
*G08B 21/00* (2006.01)
*B60K 7/00* (2006.01)
(52) U.S. Cl. ..... 320/132; 320/149; 324/426; 340/636.1; 340/636.21; 180/6.28; 180/65.21
(58) Field of Classification Search .................... 320/132
See application file for complete search history.

(56) References Cited

U.S. PATENT DOCUMENTS 5,680,030 A * 10/1997 Kadouchi et al. ............. 320/134
(Continued)

FOREIGN PATENT DOCUMENTS

JP 2002-354684 12/2002

*Primary Examiner* — Yalkew Fantu
(74) *Attorney, Agent, or Firm* — Wenderoth, Lind & Ponack, LLP

(57) ABSTRACT

The method of controlling charging and discharging in a hybrid car power source detects remaining capacity of batteries 1 that supply power to the motor 11 that drives the hybrid car, controls battery 1 charging and discharging to keep detected remaining capacity within a pre-set first targeted control range under normal conditions, and controls battery 1 charging and discharging to keep detected remaining capacity within a second targeted control range that is narrower than the first targeted control range when an abnormality is detected. Further, the method of controlling charging and discharging sets the second targeted control range to include the detected remaining capacity when the range for controlling battery 1 remaining capacity is switched from the first targeted control range to the second targeted control range at detection of an abnormality.

13 Claims, 3 Drawing Sheets

U.S. PATENT DOCUMENTS

| | | | |
|---|---|---|---|
| 6,336,063 B1 * | 1/2002 | Lennevi | 701/22 |
| 6,441,619 B1 * | 8/2002 | Araki et al. | 324/427 |
| 6,661,231 B1 * | 12/2003 | Arai et al. | 324/426 |
| 2003/0173932 A1 * | 9/2003 | Toya et al. | 320/104 |
| 2006/0076929 A1 * | 4/2006 | Tatsumi et al. | 320/132 |
| 2006/0220619 A1 * | 10/2006 | Namba et al. | 320/149 |

* cited by examiner

METHOD OF CONTROLLING BATTERY CHARGING AND DISCHARGING IN A HYBRID CAR POWER SOURCE

BACKGROUND OF THE INVENTION

1. Field of the Invention

The present invention relates to a method of controlling battery charging and discharging in a hybrid car power source, and in particular, to a method that controls charging and discharging to keep remaining battery capacity within a targeted range. Further, the present invention relates to a method of controlling charging and discharging that narrows the targeted range of control for safe charging and discharging when an abnormality is detected.

2. Description of the Related Art

In a hybrid car power source, battery charging and discharging is controlled to keep remaining battery capacity within a targeted range. For example, the targeted control range for remaining battery capacity is set to 50%±20%, which is a range from 30% to 70%. By keeping the remaining battery capacity within the targeted range, over-charging and over-discharging can be prevented and battery life can be extended. Controlling remaining battery capacity within a targeted range having a center of 50% maintains a state where the batteries can always supply power to the motor and where the batteries can be charged by regenerative braking. Therefore, the batteries can be used effectively to drive the hybrid car and achieve high mileage. By widening the targeted control range of the batteries, the effective battery capacity that can actually be used is increased. This is because the actual discharge capacity is increased and the actual charging capacity for regenerative braking is also increased. Consequently, to increase battery capacity as a practical matter, it is necessary to widen the targeted control range.

However, widening the targeted control range increases the probability of over-charging or over-discharging, which causes battery degradation. Further, it is a challenging task to consistently measure remaining capacity without error for batteries being charged and discharged. For example, remaining battery capacity can be determined by integrating battery charging and discharging current, but if the current sensor malfunctions and current cannot be measured accurately, remaining battery capacity is then determined from battery voltage and temperature. In this case, since remaining battery capacity is determined from battery voltage and temperature, accurate determination may not be possible. As a result, even when charging and discharging are controlled to keep the detected remaining battery capacity within the targeted range, it may not be possible to keep the actual remaining battery capacity within the targeted control range. In addition, if battery conditions become abnormal, internal pressure can rise and a safety valve can open to discharge gas or electrolyte solution. Even in this type of abnormal situation, the probability of being able to drive the hybrid car using the batteries can be increased by providing a mode of operation that allows battery charging and discharging, as well as a mode that prohibits any charging or discharging. The hybrid car can use the batteries most effectively with a mode that can drive normally with both the batteries and the engine, a mode that can drive with the batteries and the engine and while keeping the batteries within a narrower targeted control range, and a mode that prohibits any battery charging or discharging and can only drive with the engine. However, since various detrimental effects can occur when an abnormality occurs and the targeted control range is wide, a method to narrow the targeted control range during an abnormality has been developed. (Refer to Japanese Patent Application Disclosure 2002-354684.)

SUMMARY OF THE INVENTION

As shown in FIG. 1, the prior art method of narrowing the targeted control range during abnormal conditions controls the targeted range for remaining battery capacity to 50%±20% under normal conditions, and narrows the targeted range during abnormal conditions to 50%±5%, which is a range from 45% to 55%. When battery charging and discharging is controlled by this method and a battery abnormality occurs, it is possible, as shown by line A in FIG. 1, that remaining battery capacity lies outside the narrow targeted control range set for abnormal conditions. If the detected remaining battery capacity is outside the narrow targeted control range, batteries will be charged or discharged to bring the remaining battery capacity inside the targeted range. In the case shown in FIG. 1, battery charging and discharging is controlled to change the remaining capacity by only 5% for the narrow targeted control range of 50%±5%. However, if remaining battery capacity was 30%, for example, continuous charging to increase remaining capacity by 15% or more would be required to bring the remaining capacity within the narrow targeted control range of 45% to 55%. In a situation where an abnormality has developed, battery safety cannot always be assured for continuous charging to raise the remaining capacity by 15% or more. Correspondingly, if an abnormality was detected when remaining battery capacity was 70% in the wide targeted control range, continuous discharging to change the remaining capacity by 15% or more would be required, and again battery safety would be difficult to assure.

The present invention was developed with the object of resolving these types of drawbacks. Thus, it is a primary object of the present invention to provide a method of controlling battery charging and discharging in a hybrid car that can safely charge and discharge batteries even when an abnormality is detected and the targeted control range for remaining battery capacity is narrowed.

In the method of controlling battery charging and discharging in a hybrid car power source of the present invention, remaining capacity is detected for batteries that supply power to the driving motor of the hybrid car, and under normal battery conditions, charging and discharging is controlled to keep the detected remaining capacity within a predetermined wide targeted control range. When an abnormality is detected, battery charging and discharging are controlled to keep the detected remaining capacity within a targeted control range that is narrower than the wide targeted range for normal operation. Further, the method of controlling charging and discharging sets the narrow targeted control range to include the detected remaining battery capacity at the time of the abnormality when the targeted control range for remaining capacity is switched from the wide range to the narrow range.

The method of controlling charging and discharging described above has the characteristic that batteries can be safely charged and discharged even when abnormal conditions are detected and the targeted control range for remaining capacity is narrowed. This is because the narrow targeted control range is set to include the remaining capacity detected when the abnormality occurred, instead of using the same standard remaining capacity reference, such as 50%, for both the wide targeted range and the narrow targeted range as in the prior art. Consequently, this method has the characteristic that when an abnormality is detected and the targeted control range is narrowed, there is no continuous charging or discharging of the batteries and they can be used safely.

The above and further objects of the present invention as well as the features thereof will become more apparent from the following detailed description to be made in conjunction with the accompanying drawings.

DETAILED DESCRIPTION OF THE PREFERRED EMBODIMENT(S)

In the method of controlling charging and discharging, the remaining battery capacity reference for the wide targeted control range can be 45% to 55%, and the width of the wide targeted control range can extend from 30% to 60%.

In the method of controlling charging and discharging, the remaining battery capacity reference for the narrow targeted control range can be the remaining capacity detected at the time of abnormality. The width of the narrow targeted control range can be from ⅕ to ½ the width of the wide targeted control range.

In the method of controlling charging and discharging, the width of the narrow targeted control range can be controlled by battery temperature.

In the method of controlling charging and discharging, remaining capacity of the batteries can be determined from battery charging and discharging current, battery voltage, and battery temperature.

Figure 1:
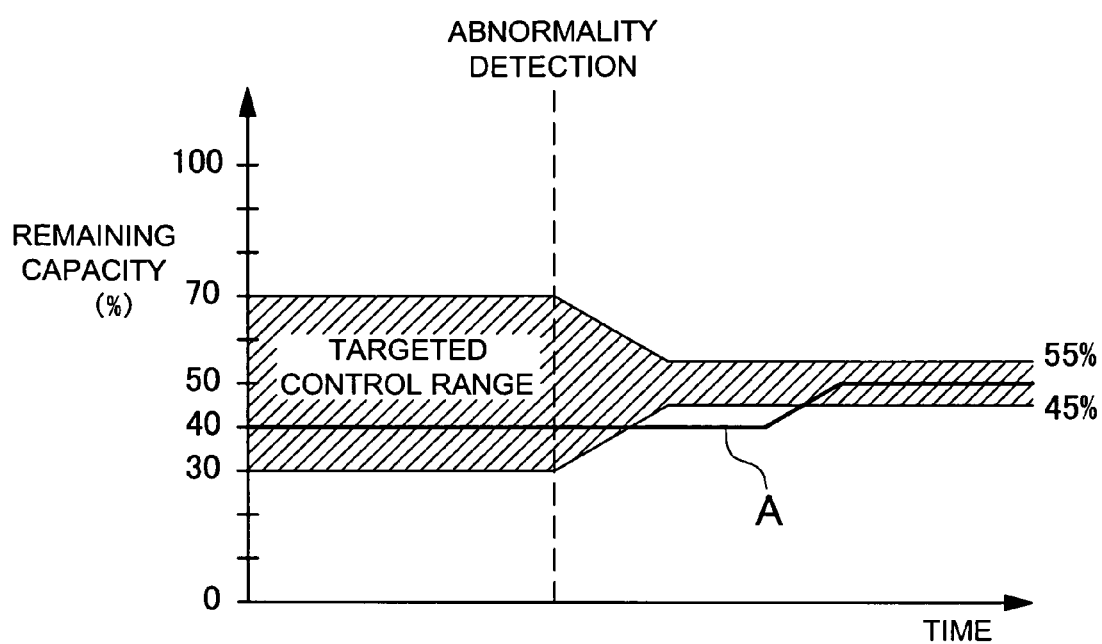
FIG. 1 is a graph showing narrowing of the targeted control range for a prior art method of controlling charging and discharging.
Figure 2:
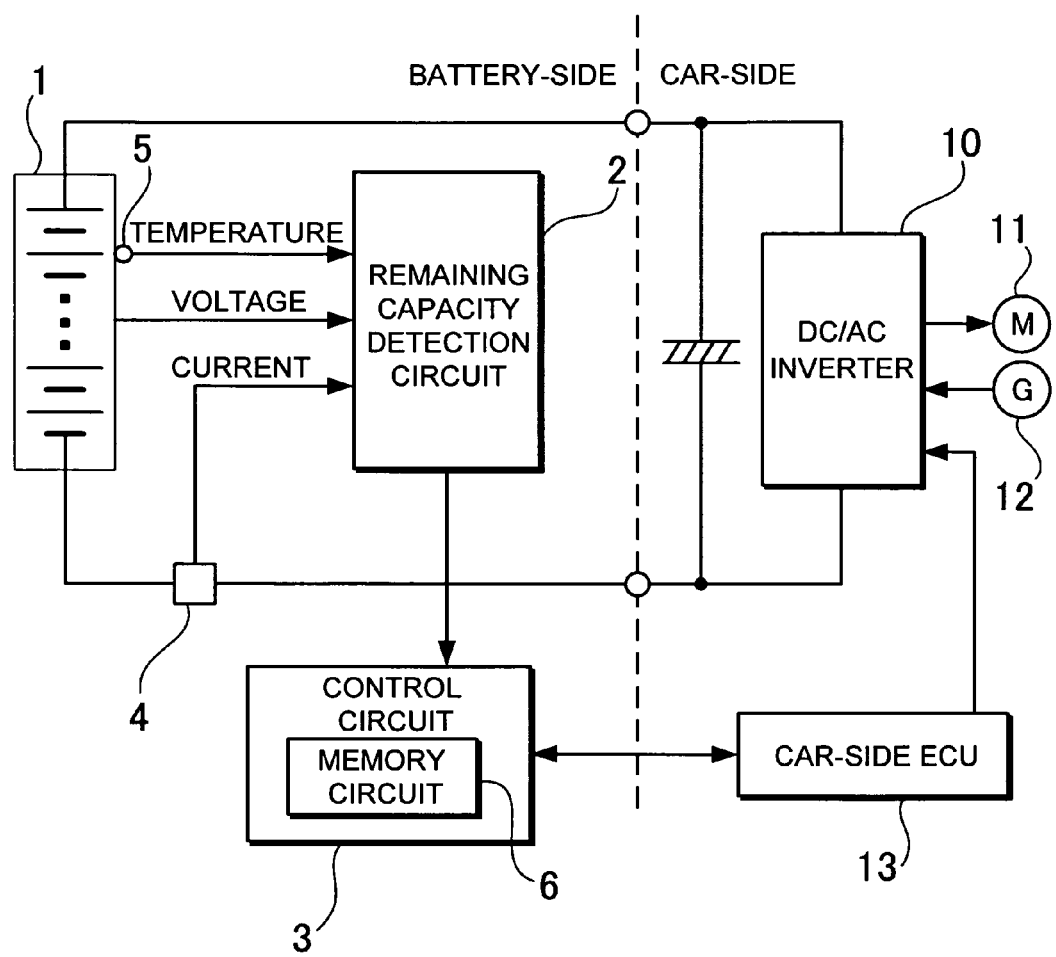
FIG. 2 is a block diagram showing one example of a hybrid car power source that is charged and discharged according to an embodiment of the method of controlling charging and discharging of the present invention.

The following describes embodiments based on the figures. FIG. 2 is a block diagram showing a hybrid car power source. The power source shown in this figure is provided with batteries 1 that supply power to the car driving motor 11 and are charged by a generator 12 installed on-board the car; a remaining capacity detection circuit 2 that determines the remaining capacity of the batteries 1; and a control circuit 3 that controls battery 1 charging and discharging according to the remaining battery capacity determined by the remaining capacity detection circuit 2.

The batteries 1 are a plurality of nickel-hydride batteries connected in series to establish an output voltage of several hundred volts, for example, 200V to 300V. However, instead of nickel-hydride batteries, lithium-ion batteries can also be used. Since the output voltage of lithium-ion batteries is high, a smaller number of batteries can be connected in series to establish an output voltage of several hundred volts. In addition, since the capacity per unit weight is high for lithium-ion batteries, the power source can be made light-weight and high-capacity.

In a hybrid car, the motor 11 and generator 12 are connected to the batteries 1 through a direct-current to alternating-current (DC/AC) inverter 10. The DC/AC inverter 10 is controlled by an electronic control unit (ECU) 13, which is a car-side control circuit. The ECU 13 controls power supplied from the batteries 1 to the motor 11, namely battery 1 discharging. The ECU 13 also controls power supplied from the generator 12 to the batteries 1, namely battery 1 charging. The car-side ECU 13 controls the DC/AC inverter 10 to control battery 1 charging and discharging based on signals from the battery-side control circuit 3, and based on car-side signals, such as signals indicating the amount of accelerator input and brake operation.

The remaining capacity detection circuit 2 integrates battery 1 charging and discharging current to compute remaining battery capacity, or the battery state of charge (SOC). Specifically, the remaining capacity detection circuit 2 adds integrated values of the charging current and subtracts integrated values of the discharging current to compute remaining capacity in Ampere-hours (Ah). The computed remaining battery capacity (Ah) is compared to the full-charge remaining battery capacity (Ah) to determine a relative remaining capacity (SOC %), which is 100% for fully-charged batteries 1. In addition, the remaining capacity detection circuit 2 determines remaining capacity based on battery 1 voltage and temperature. A remaining capacity detection circuit 2 that uses this method to determine remaining battery capacity stores a function or look-up-table in memory (not illustrated) that relates remaining capacity to voltage and temperature. Further, the remaining capacity detection circuit 2 can correct remaining capacity computed by current integration with remaining capacity determined from voltage and temperature. A remaining capacity detection circuit 2, which determines remaining capacity by this method, corrects remaining capacity determined by current computation with remaining capacity determined from voltage and temperature at points where the battery 1 voltage reaches a maximum voltage and where it drops to a minimum voltage.

Further, when circuitry that determines remaining capacity by current integration malfunctions, the remaining capacity detection circuit 2 determines remaining capacity from voltage and temperature. Except for cases where battery 1 voltage is a maximum or minimum, this method of determining remaining capacity is less accurate than determining remaining capacity by integrating current. To reduce battery degradation in a hybrid car power source under normal operating conditions, operation does not cause the battery 1 voltage to rise to a maximum voltage or drop to a minimum voltage. Specifically, to reduce degradation and increase battery life, remaining capacity is controlled within a given targeted control range centered at a remaining capacity of 50%. Although remaining capacity determined from battery 1 voltage and temperature has a high degree of accuracy at, or near points where the battery 1 voltage is a maximum or minimum, it is less accurate than remaining capacity determined from current integration at mid-range voltages.

The control circuit 3 controls battery 1 charging and discharging to keep the remaining battery capacity determined by the remaining capacity detection circuit 2 within a predetermined targeted control range. Under normal operating conditions, the control circuit 3 controls charging and discharging to keep the detected remaining capacity within a predetermined wide targeted control range. When an abnormality is detected, the control circuit 3 controls charging and discharging to keep the detected remaining capacity within a narrow targeted control range, which is narrower than the predetermined wide targeted control range.

Figure 3:
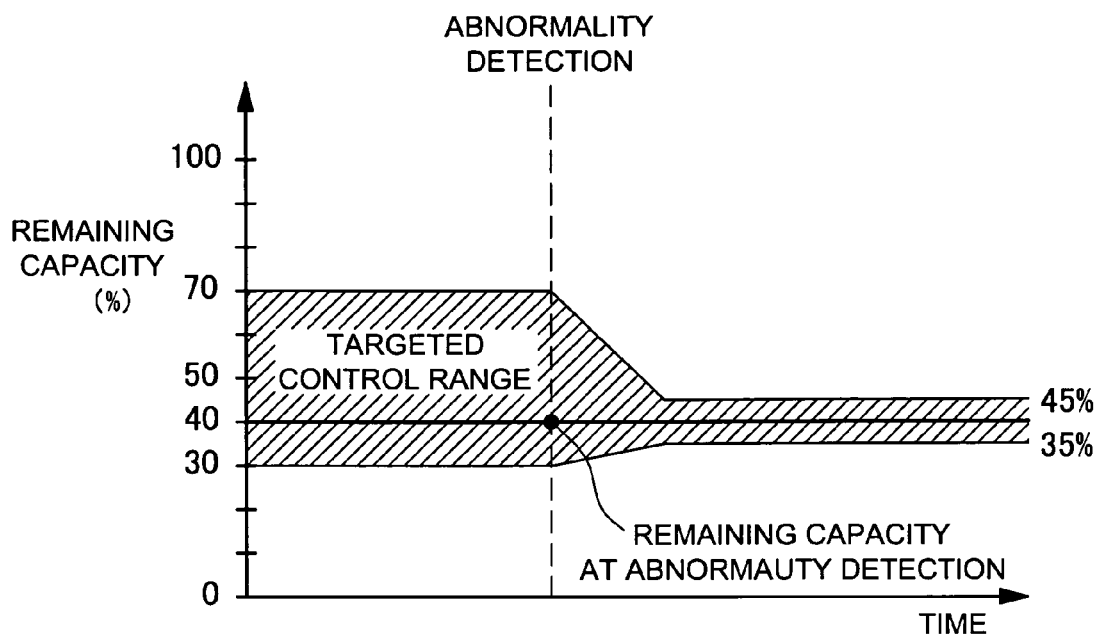
FIG. 3 is a graph showing one example of targeted control range narrowing in an embodiment of the method of controlling charging and discharging of the present invention.
Figure 4:
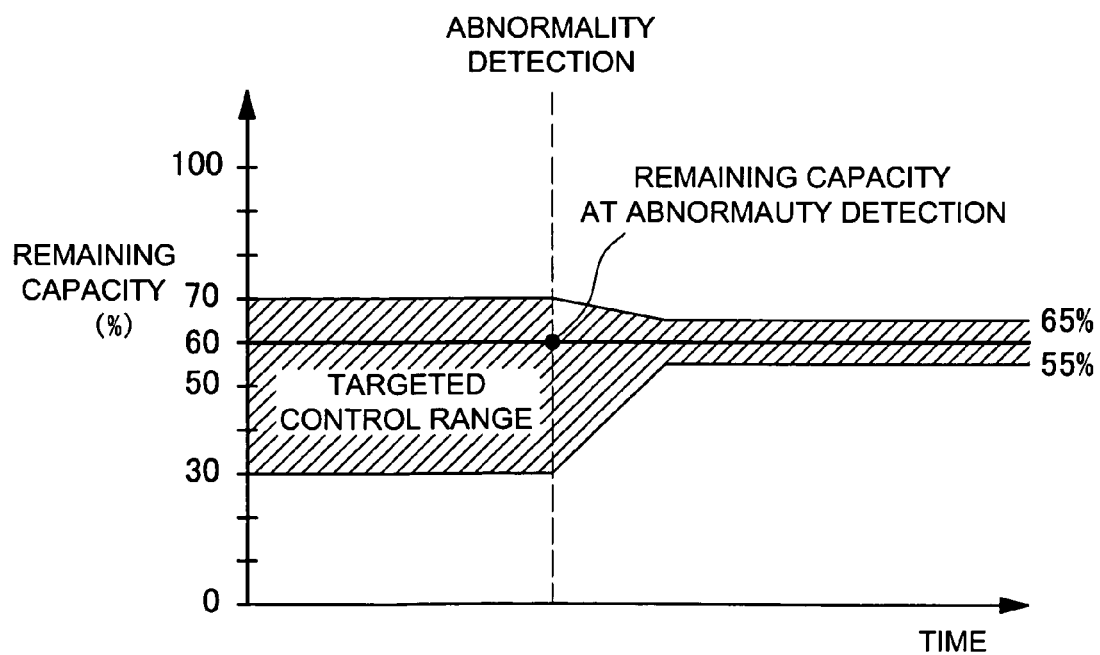
FIG. 4 is a graph showing another example of targeted control range narrowing in an embodiment of the method of controlling charging and discharging of the present invention.

As shown in FIGS. 3 and 4, the control circuit 3 controls remaining battery capacity within a wide targeted control range under normal conditions. When an abnormality occurs, the control circuit 3 controls charging and discharging to limit remaining battery capacity to a narrow targeted control range. Here, the abnormality is a problem with a severity that tolerates battery charging and discharging over a limited range, but does not mandate complete suspension of battery charging and discharging. The abnormality can be a problem such as failure of circuitry that detects current via a current sensor 4 and computes remaining battery capacity, or failure of some of the temperature sensors 5, or voltage imbalance of the many series connected batteries 1 becoming greater than a set value. In these types of problems, low capacity charging and discharging can be tolerated without complete shutdown of all battery 1 charging or discharging.

FIGS. 3 and 4 show a wide targeted control range of 50%±20% where charging and discharging are controlled to maintain remaining battery capacity from 30% to 70%. This wide targeted control range has a center reference remaining capacity of 50%, but the reference remaining capacity can be set from 45% to 55%. By setting the reference remaining capacity less than 50%, charging capacity due to regenerative braking can be increased. In contrast, by setting the reference remaining capacity greater than 50%, discharging capacity can be increased to supply more power to the motor 11. Although the wide targeted control range in FIGS. 3 and 4 has a width of ±20%, or 40%, targeted range width can be set from 30% to 60% considering battery 1 characteristics, desired battery 1 life-time, and the amount of power to be supplied from the batteries 1 to the motor 11. The effective charging and discharging capacity of the batteries 1 can be increased by widening the targeted control range. Correspondingly, battery 1 life-time can be increased by narrowing the width of the wide targeted control range.

In FIGS. 3 and 4, the remaining battery capacity at the time an abnormality is detected is taken as the reference remaining capacity and the narrow targeted control range is established ±5% around that reference remaining capacity. The reference remaining capacity for the wide targeted control range, which is 50%, is not changed. However, the reference remaining capacity is changed to the detected remaining capacity at the time the abnormality occurred to establish the narrow targeted control range. Consequently, the reference remaining capacity for the narrow targeted control range does not always become 50%. The reference remaining capacity for the narrow targeted control range changes depending on the remaining capacity detected at the time the abnormality occurred. In FIG. 3, since the remaining capacity at the time the abnormality occurred was 40%, the narrow targeted control range is established at 40%±5%, or 35% to 45%. In FIG. 4, since the remaining capacity at the time the abnormality occurred was 60%, the narrow targeted control range is established at 60%±5%, or 55% to 65%.

As shown in FIGS. 3 and 4, the narrow targeted control range is narrower than the wide targeted control range. In FIGS. 3 and 4, the narrow targeted control range is ¼ the width of the wide targeted control range. Specifically, the narrow targeted control range is set at the detected remaining capacity at the time the abnormality occurred ±5%. In a power source with nickel-hydride batteries, under conditions where hydrogen gas is evolved, the safety valve will not open for charging and discharging with a capacity on the order of 5%. This is because the amount of gas generated at that level charging and discharging can accumulate internally in the batteries without creating excessive pressure. Consequently, a narrow targeted control range that allows charging and discharging of 5%, with the detected remaining capacity at the time the abnormality occurred as the reference remaining capacity, has the characteristic that the batteries can be used safely without exhausting gas at the time of abnormality. However, the narrow targeted control range can also be established from ⅕ to ½ the width of the wide targeted control range.

In FIGS. 3 and 4, the narrow targeted control range is established with the detected remaining battery capacity at the time of abnormality as the reference remaining capacity, and the charging-side capacity and discharging-side capacity are set equal. However, although the detected remaining battery capacity at the time of abnormality is taken as the reference remaining capacity, the charging-side capacity and discharging-side capacity do not necessarily have to be set equal. The charging-side capacity and discharging-side capacity can be set to different capacities. For example, the discharging-side capacity can be greater than the charging-side capacity with respect to the reference remaining capacity, or conversely, the discharging-side capacity can be less than the charging-side capacity.

Further, the width of the narrow targeted control range can be varied depending on battery 1 temperature. By narrowing the narrow targeted control range when battery 1 temperature becomes high, batteries 1 can be charged and discharged more safely during an abnormality.

Under conditions where no abnormality is detected, the control circuit 3 described previously controls battery 1 charging and discharging to maintain the remaining capacity within a pre-set wide targeted control range. Specifically, the control circuit 3 controls charging and discharging to keep remaining battery capacity within the wide targeted control range. Therefore, when remaining battery capacity drops to the lowest value in the wide targeted control range, which is 30% in FIGS. 3 and 4, the control circuit 3 stops battery 1 discharging. In contrast, when remaining battery capacity rises to the maximum value of 70%, the control circuit 3 stops charging. Specifically, the control circuit 3 controls remaining battery capacity over the entire wide targeted control range. When an abnormality is detected, the control circuit 3 switches remaining battery capacity limits from the wide targeted control range to the narrow targeted control range. Here, the narrow targeted control range is set to include the remaining battery capacity at the time the abnormality was detected. For example, the narrow targeted control range is set with the detected remaining battery capacity at the time of abnormality as the reference remaining capacity, and is set to allow charging of 5% and discharging of 5%. The narrow targeted control range is pre-stored in a memory circuit 6 in the control circuit 3. In addition, the control circuit 3 can detect battery 1 temperature and reduce the width of the narrow targeted control range according to battery 1 temperature increase to assure even safer battery 1 charging and discharging.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2008-195384 filed in Japan on Jul. 29, 2008, the content of which is incorporated herein by reference.

What is claimed is:

1. A method of controlling battery charging and discharging in a hybrid car power source, the method comprising:

a step to detect remaining capacity of batteries that supply power to a motor that drives the hybrid car; and based on detection results, a step to control charging and discharging to keep detected remaining capacity within a pre-set first targeted control range when battery conditions are normal; and a step to control charging and discharging to keep detected remaining battery capacity within a second targeted control range, which is narrower than the first targeted control range, when an abnormality is detected;

wherein when an abnormality is detected, the second targeted control range is set to include the remaining battery capacity detected at the time the range for controlling remaining capacity is switched from the first targeted control range to the second targeted control range, which is the remaining capacity at abnormality detection.

2. The method of controlling battery charging and discharging in the hybrid car power source as cited in claim 1 wherein the reference remaining capacity for the first targeted control range is set from 45% to 55%, and the width of the first targeted control range is set from 30% to 60%.

3. The method of controlling battery charging and discharging in the hybrid car power source as cited in claim 1 wherein the reference remaining capacity for the second targeted control range is set to the remaining capacity at abnormality detection.

4. The method of controlling battery charging and discharging in the hybrid car power source as cited in claim 2 wherein the width of the second targeted control range is set from $\frac{1}{5}$ to $\frac{1}{2}$ the width of the first targeted control range.

5. The method of controlling battery charging and discharging in the hybrid car power source as cited in claim 1 wherein the width of the second targeted control range is controlled according to battery temperature.

6. The method of controlling battery charging and discharging in the hybrid car power source as cited in claim 5 wherein the width of the second targeted control range is narrowed as battery temperature increases.

7. The method of controlling battery charging and discharging in the hybrid car power source as cited in claim 1 wherein remaining battery capacity is determined from battery charging and discharging current, battery voltage, and battery temperature.

8. The method of controlling battery charging and discharging in the hybrid car power source as cited in claim 1 wherein the batteries are either nickel-hydride batteries or lithium-ion batteries.

9. The method of controlling battery charging and discharging in the hybrid car power source as cited in claim 3 wherein the batteries are nickel-hydride batteries and the width of the second targeted control range is set $\frac{1}{4}$ the width of the first targeted control range.

10. The method of controlling battery charging and discharging in the hybrid car power source as cited in claim 3 wherein the reference remaining capacity for the second targeted control range is set to the remaining capacity at abnormality detection, and the charging-side capacity and the discharging-side capacity are set to the same capacity.

11. The method of controlling battery charging and discharging in the hybrid car power source as cited in claim 3 wherein the reference remaining capacity for the second targeted control range is set to the remaining capacity at abnormality detection, and the charging-side capacity and the discharging-side capacity are set to different capacities.

12. The method of controlling battery charging and discharging in the hybrid car power source as cited in claim 11 wherein the second targeted control range is set with greater discharging-side capacity than charging-side capacity with respect to the reference remaining capacity.

13. The method of controlling battery charging and discharging in the hybrid car power source as cited in claim 11 wherein the second targeted control range is set with less discharging-side capacity than charging-side capacity with respect to the reference remaining capacity.

* * * * *